BEST AVAILABLE COPY

UNITED STATES PATENT OFFICE.

BENJAMIN SILLIMAN, OF NEW HAVEN, ASSIGNOR TO THE MERIDEN BRITANNIA COMPANY, OF WEST MERIDEN, CONNECTICUT.

IMPROVEMENT IN PROCESSES OF IMPARTING RESONANCE TO METALLIC ALLOYS.

Specification forming part of Letters Patent No. 171,959, dated January 11, 1876; reissue No. 7,052, dated April 11, 1876; application filed April 6, 1876.

DIVISION B.

*To all whom it may concern:*

Be it known that I, BENJAMIN SILLIMAN, of New Haven, in the county of New Haven and State of Connecticut, have invented a new Improvement in the Manufacture of Articles from Metallic Alloys; and I do hereby declare the following to be a full, clear, and exact description of the same.

This invention relates especially to articles or ware made from that class of metallic alloys known as Britannia, pewter, and white metal, and composed of tin or other soft metal hardened by antimony, copper, zinc, and the like, which, as now manufactured, are notoriously deficient in resonance, giving, when struck, only a dull and leaden sound. Whatever degree of resonance or ring the ingots or casts of these alloys may possess is entirely destroyed by the mechanical processes of rolling or lamination, of spinning and striking up, by which means these articles are chiefly brought into the desired forms during their manufacture.

Many attempts have been made to impart this desirable musical quality to such wares by changing the proportion of their ingredients, and otherwise, but hitherto, and until my invention, without success. I have, therefore, applied to articles of such manufacture a system of tempering which imparts to the articles the desired properties of resonance, and at the same time an increased strength.

In carrying out this manufacture by this process, all vessels of capacity of whatever form or dimension, and all other articles of the class of metallic alloys named are endowed with the musical quality so justly esteemed but hitherto wanting in these wares, and supposed to be peculiar to the harder alloys, and which, until my invention, it has been considered impossible to develop in Britannia, and other like alloys.

I will now proceed to describe the process whereby articles possessing the properties aforesaid may be produced.

I provide a bath or vessel of capacity sufficient to accommodate the largest articles to be treated. It may be made of copper or of iron, as may be most convenient, and must be provided with an easily-regulated source of heat, such as is found in a good gas-furnace. This bath may be filled with either paraffine or a heavy mineral oil, freed in its manufacture from all the lighter oils of low boiling-point, and capable of withstanding a temperature of at least 500° Fahrenheit without boiling.

The oils known as "Downer's Spindle Oil," and "Merrill's Neutral Heavy Hydrocarbon Oil," of a density not less than 25° Baumé fulfill these conditions, and are found in commerce.

The temperature of this bath must be raised to about 220° centigrade or 428° Fahrenheit, and then more gradually to about 230° centigrade or 446° Fahrenheit—that is, just below the melting-point of Britannia, which will be found to vary as produced by different makers.

It is quite essential that in every case the expert using my invention should determine, by the thermometer, the exact melting-point of his own alloy, and also its temperature of solidification. It will be found by trial that these alloys, suspended in the bath will endure a temperature several degrees above what they can stand if they are permitted to touch the metallic sides or bottom of the bath. A wire or rod of metal less fusible than the alloy, if permitted to touch it when near the point of its fusion, cuts it like a soldering-iron, these two points being experimentally determined—viz., the melting point, and, so to speak, the freezing or solidifying point.

In practicing my invention the bath should be kepth within, say, 10° Fahrenheit of the melting-point of the alloy, and the articles to be treated immersed therein for a brief time, which will vary with the size and weight of the articles treated. For small and rather thin pieces, I have found from fifteen to thirty seconds a sufficient time. For larger articles of greater weight, like urns, soup-tureens, &c., the time may be safely extended to a minute or more.

Care is requisite in handling objects at this temperature to support them in a way to pre-

BEST AVAILABLE COPY vent distortion or collapse, for the alloy, when heated to the required degree, becomes very flexible. All contact of the articles with tools of metal must be avoided beneath the hot bath.

The time requisite for the treatment of such articles as are bathed on only one surface may be somewhat longer than when the immersion is total.

Like all other arts of manual dexterity their treatment is soon learned by an expert workman. Care is needed to avoid contact of water, or even of a damp surface with the bath at the temperature required, as the sudden generation of steam might occasion an explosive scattering of the hot bath with serious effects. It is also desirable that the bath should be provided with a hood leading into a well drawing flue, to carry away the heavy vapors given off during the process.

As the result sought is almost instantaneous, the expert using my process has it always in his power to judge if the right degree of ring or resonance has been attained, and can repeat the process, if found needful. The rapid cooling of the articles after they are withdrawn from the bath makes no difference either with their musical resonance or their stiffness, both which qualities are equally produced by allowing the articles to cool slowly or quickly. If, however, to save time, they are cooled in water, they must be very thoroughly dried before again plunging them in the bath.

If any portion of the objects thus treated fails of being brought up to the proper crystallizing temperature, the resonance of the articles is greatly impaired, such uncrystallized parts failing to vibrate in unison with the rest, a discord is produced.

Articles thus treated by my process lose part of the density imparted by the mechanical pressure of rolling, &c., but do not become porous like the cast articles. They also acquire a sensibly increased stiffness or temper, enabling them the better to stand rough usage. This important quality is, equally with the resonance or ring, due to the molecular rearrangement of the particles in a crystalline order, imparting a rigidity which is not found in the laminated and spun metal.

Articles prepared by my process can be soldered, turned, plated, burnished, and submitted to any of the mechanical processes requisite in their manufacture, except those of rolling, spinning, and the like, without loss of the musical property imparted by my method of treatment.

Although I prefer and advise the method already described for obtaining the uniform application of th· temperature requisite for the production of the musical ring, I do not confine myself to the exclusive use of a bath of oil, paraffine, or the like, since the same results may be attained by the use of other vehicles of heat, such as an air-bath or oven, superheated steam, and the like; but in practice nothing will be found so convenient and so economical as a bath such as I have described.

I claim—

A new manufacture, possessing the substantial properties herein described, consisting of articles made from metallic alloys, known as Britannia, pewter, &c., possessing resonance from having been subjected to a regulated temperature just short of the melting-point, substantially as described.

B. SILLIMAN.

Witnesses:

JOHN E. EARLE,

CLARA BROUGHTON.